United States Patent [19]

Baker

[11] Patent Number: 4,497,338

[45] Date of Patent: Feb. 5, 1985

[54] RELIEF VALVE

[76] Inventor: William E. Baker, 10627 Sugar Hill, Houston, Tex. 77042

[21] Appl. No.: 535,209

[22] Filed: Sep. 23, 1983

[51] Int. Cl.³ .............................................. F16K 17/04
[52] U.S. Cl. .................................... 137/467; 137/514.7;
           137/528; 137/529; 137/624.27; 251/297
[58] Field of Search .................. 137/467, 514.7, 528,
           137/529, 538, 624.27; 251/297

[56] References Cited

U.S. PATENT DOCUMENTS

| 2,902,046 | 9/1959 | Dollison | 137/467 |
|---|---|---|---|
| 3,174,500 | 3/1965 | Johnson | 251/297 X |
| 3,384,111 | 5/1968 | Webb | 137/467 X |
| 3,409,037 | 11/1968 | Nelson | 137/467 X |
| 4,015,627 | 4/1977 | Bower | 137/624.27 X |
| 4,185,661 | 1/1980 | Gill | 251/297 X |

FOREIGN PATENT DOCUMENTS 767346  1/1957  United Kingdom ............... 251/297

*Primary Examiner*—Robert G. Nilson
*Attorney, Agent, or Firm*—Bill B. Berryhill

[57] ABSTRACT

A relief valve for relieving excessive fluid pressures in a fluid pressure system comprising: a valve body having a cavity therein and an inlet port and an outlet port in fluid communication with the cavity; and a plug assembly carried in the valve body for reciprocal movement between a closed position in which the plug assembly prevents flow of fluids through the inlet port and an open position, in which the plug assembly permits flow of fluids through the inlet port and into the cavity for exit through the outlet port. A release mechanism is carried by the valve body for holding the plug assembly in the closed position but responsive to fluid pressures above a predetermined amount at the inlet port to release the plug assembly for movement toward the open position, the release mechanism including a split ring engageable with a corresponding annular shoulder carried by the valve body for holding the plug assembly in the closed position, the split ring being radially contractable in response to predetermined fluid pressures for disengagement from said annular shoulder, allowing the plug assembly to move toward the open position.

20 Claims, 5 Drawing Figures ially reset. In either case, the accuracy and reliability are great.
RELIEF VALVE

BACKGROUND OF THE INVENTION

1. Field of the Invention

The present invention pertains to valves. Specifically, it pertains to a relief valve suitable for relieving excessive fluid pressures in a fluid pressure system.

2. Brief Description of the Prior Art

Valves are used in a variety of applications and designs. One application is for relieving excessive pressures in pressure vessels or fluid systems. Such valves are sometimes called relief valves. The purpose of a relief valve is to relieve excessive pressures in the vessel or pressure system to which it is attached to avoid damage to the vessel or system and to prevent hazardous situations. There are, of course, many types of relief valves. Some such valves open at preset pressures and are automatically reset or closed when pressure is reduced to a certain level. In other relief valves manual resetting is required.

A variety of relief valves are used in the oil and gas industry. One particular application in the oil and gas industry is for relieving excessive pressures in drilling fluid systems. The fluid being handled in a drilling fluid system is usually abrasive, may be corrosive and is very harsh on a valve. Due to the high risk to life and property, such a valve must be extremely reliable, able to function under adverse conditions and essentially tamper-proof in the field. Some of the most popular pressure relief valves suitable for use with oil and gas drilling fluid systems are those manufactured by OTECO Equipment Company of Houston, Tex.; DEMCO of Tulsa, Okla.; and Cameron Iron Works, Inc., of Houston, Tex. Several such valves utilize a plug or piston type closure member which is pinned in place by a nail or shear pin. When pressure in the system exceeds a certain value, the nail or pin is sheared and the pressure relieved. However, nails and pins are not always of the same strength. Furthermore, due to the fluctuating pressures in such a system, the nail or pin material may be fatigued so that it may shear at a lower pressure than desired. When this occurs, many workers insert a larger nail or pin or in some cases, a member of much greater shear strength such as an Allen wrench. As a consequence, the valve may not open at the desired pressure level or in fact may never open at all, causing serious danger. In addition such a valve must be manually reset after it is opened.

Other relief valves manufactured and sold by Cameron Iron Works, Inc. of Houston, Tex., and Weatherford/DMC of Houston, Tex., utilize spring-loaded valves. Some of these valves are manually reset and others are automatically reset. However, they are relatively complex and expensive to manufacture and maintain. Furthermore, accurate field adjustment of such valves is not always possible.

One of the problems associated with a relief valve of the type to be utilized with drilling fluid or mud systems is erosion. If the valve only gradually opens or quickly cycles between an open position and a closed position, the valve is likely to be severely damaged or destroyed by erosion. Thus, it is desirable for such a valve, when it opens, to quickly move to a full open position so that such erosion does not occur. This suggests the use of a pilot system or detent mechanism by which the valve closure member is not actuated until there is sufficient force to assure a full opening. Various types of pilot or control systems for opening of valves may be seen in U.S. Pat. Nos. 2,736,297; 3,132,668; 4,026,326; and 4,073,466. Such systems are relatively complex and expensive. A common form of detent mechanism utilized in such valves is a metal ball located in a hole at the surface of the member that is movable with respect to an adjacent member. When the adjacent member moves in a direction that lines up the ball with a detent, the ball is then forced into the detent by gravity, a spring or other means. The depth of the detent is about equal to the ball radius so that the ball is at the intersection of both adjacent surfaces. In this position, the surfaces cannot move with respect to each other.

To increase the holding power of such detent mechanism, a plurality of balls in a groove may be used. However, since balls have point contact, their load-bearing capacity without exceeding the yield point is relatively low. This may result in galling or damaging of the balls and malfunctioning of the mechanisms.

SUMMARY OF THE INVENTION

In the present invention a relief valve is provided which includes a valve body having a cavity therein and an inlet and an outlet port in fluid communication with the cavity. A plug or piston type closure member is carried in the valve body for reciprocal movement between a closed position in which the plug permits flow of fluids through the inlet port and an open position in which the plug permits flow of fluids through the inlet port and into the cavity for exit through the outlet port. A release mechanism is carried by the valve body for holding the plug in the closed position but responsive to fluid pressure above a predetermined amount at the inlet port to release the plug for movement toward the open position.

The release mechanism of the present invention is unique in that it utilizes a split toroidal as a detent. The load bearing capacity of such a detent mechanism is increased because there is line contact between a shoulder or groove and the toroidal ring, as opposed to point contact of a ball detent mechanism. If such a split ring has a rectangular cross section beveled on the edge in contact with a groove or shoulder which is also beveled, then surface or area contact between the ring and the shoulder is obtained and the load bearing capacity of the ring and shoulder within the yield strength of the material is greatly increased.

The split ring, when acted upon by an axial force against a tapered or beveled shoulder will be contracted radially inward by a component of that axial force. The amount of force necessary to contract the ring sufficiently to disengage the shoulder may be accurately determined. If a cylindrical member or surface is placed in the inside diameter of the split ring, then the ring, under an axial load will not contract until the cylindrical member is removed from the inside diameter of the split ring. If the cylindrical restraining member is not removed until a predetermined force, in excess of that necessary to contract the ring, is applied, then when it is removed the ring is quickly contracted freeing the plug member for immediate release and quick full opening.

The relief valve of the present invention is capable of being reset. In some embodiments, it is automatically reset. In other less expensive embodiments, it is manually reset. In either case, the accuracy and reliability are great.

In many embodiments of the invention, the release pressure or the pressure at which the valve is opened may be easily adjusted in the field. Shock mechanism may also be provided to cushion the quick opening of the valve to prevent undue damage thereto. In fact, many other objects and advantages of the invention will be apparent from reading the specification which follows in conjunction with the accompanying drawings.

DESCRIPTION OF PREFERRED EMBODIMENTS

Figure 1:
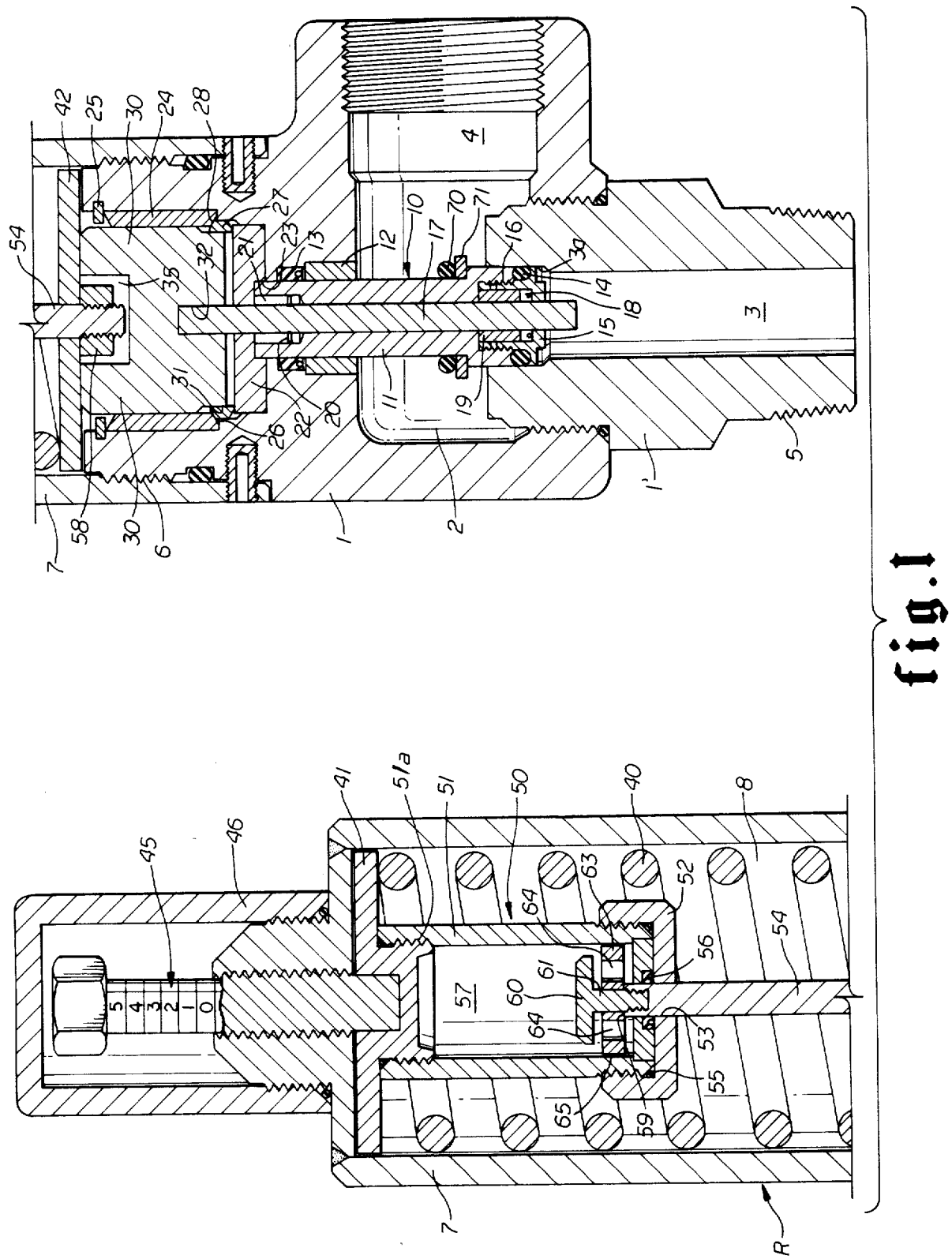
FIG. 1 is an elevation view, in cross section, of an automatically resettable relief valve according to a preferred embodiment of the invention.

Referring now to FIG. 1, a relief valve R according to a preferred embodiment of the invention will be described. The valve includes a valve body 1 having a cavity 2 therein, an inlet port 3 and an outlet port 4. The inlet port 3 is actually in a valve body sub 1' which may be threaded at 5 for connection to a fluid pressure system, e.g. a drilling fluid system for drilling of an oil and/or gas well. Threadedly connected to the valve body 1 at 6 is a valve bonnet or housing 7 which could be referred to as part of the valve body. In fact, it is intended that the term "valve body" as used herein and in the claims hereafter shall refer not only to the main component of the valve body 1 but also to the sub 1' and the bonnet 7.

Carried in the valve body 1 is a plug or closure assembly 10. The plug assembly 10 includes a cylindrical body 11 which is centrally disposed in the valve body 1 coaxially with the inlet port 3 and a counterbored hole which communicates the cavity 2 with the area enclosed by the bonnet 7. This counterbored hole is provided with a bronze bushing 12 and an annular seal 13 which allows reciprocal movement of the plug assembly 10 but seals the pressure in the cavity 2 from the bonnet chamber area 8.

The lower end of the plug body 11 is provided with an annular seal 14 which is slidingly and sealingly engageable with a sealing surface 3a of the inlet port 3. Of course, many types of sealing arrangements may be provided. In the exemplary embodiment, the annular seal 14 is held in place by a seal retainer ring which is threadedly connected to the internal threads 16 of a counterbored hole in the lower end of the cylindrical body 11.

Centrally disposed in a coaxial hole provided therefor in the cylindrical member 11 is a plunger or piston 17, the purpose of which will be more fully understood hereafter. An annular seal 18 and a seal retainer 19 surround the lower end of the plunger or piston 17 allowing reciprocation thereof, but sealing against the fluid pressure in the inlet port 3. A snap ring 20 is attached to the plunger or piston 17 within counterbore 21 of the cylindrical member 11 to prevent the plunger or piston 17 from dropping through the port 3.

Thus, plug assembly 10 is carried in the valve body 1 for reciprocal movement between a closed position (as shown in FIG. 1) preventing flow of fluids through the inlet port 3 and an open position (not shown) in which the plug assembly 10 permits flow of fluids through the inlet port 3 and into the cavity 2 for exit through the outlet port 4.

Mounted at the top of the plug assembly 10 is a disc or plate 22 which is counterbored at 23 to receive the upper end of the plug cylinder body 11. Thus, the plug cylinder 11 and the other components of the plug assembly 10 (except piston 17) cannot move upwardly, with respect to the bonnet chamber 8, without this plate or thrust member 22 also moving upwardly.

The upper portion of the valve body 1 is counterbored to receive a cylindrical ring 24 of relatively hard material. The ring 24 is held in place by a snap ring 25. It will be noted that the lower end of the ring 24 is tapered or beveled to provide a tapered annular shoulder 26. Resting just below the tapered shoulder 26 on the thrust plate 22 is a split ring 27. The split ring 27 also has at least one tapered surface 28 which is mutually engageable with the tapered shoulder 26 of the ring 24. As mentioned, the ring 27 is split and, if not hindered from doing so by an interfering object, may be contracted if radial forces are applied thereto. Knowing the inside and outside diameters of the ring 27, the radial thickness of the ring cross-section, the bevel angle of the surfaces 28 and 26, the coefficient of friction between the ring 27 and the ring 24 and the modulus of elasticity of the ring material, the amount of axial force necessary to contract the ring 27 can be accurately determined. The axial force F can be mathematically determined from the following formula:

$$F = \frac{2 \, rp}{\tan(\theta - \tan^{-1}\mu)}$$

where:

F = axial force
r = radial distance to the center of the beveled surface;
p = radial pressure required to close the gap in the split ring
θ = beveled angle for the ring
μ = coefficient of friction.

The split ring 27 and the ring 24 which provides the beveled shoulder 26 are components of a release mechanism by which the plug assembly 10 is held in the closed position of FIG. 1. To prevent the ring 27 from being contracted, a cylindrical restraining member 30 is provided. This restraining member 30 is provided with a cylindrical surface 31 which is engageable with the interior of the split ring 27 to prevent its radial contraction. However, if the restraining member 30 were axially displaced from the interior of the split ring 27, there would be nothing to prevent contraction of the ring. It will be noted that a central hole 32 is provided in the lower end of the restraining member 30 to receive the upper end of the plunger or piston 17.

It can be understood that with the ring 27 in the position of FIG. 1, the plug assembly 30 must remain in the closed position of FIG. 1. However, it can also be understood that if the restraining member 30 were disengaged from the interior of the ring 27 and enough pressure applied to the lower end of the plug assembly 10 in port 3, the radial force component produced by such pressure would cause the split ring 27 to contract to an outside diameter no greater than the inside diameter of the ring 24, thus allowing the split ring 27 to move upwardly within the ring 24 and freeing the plug assembly 10 to move upwardly to an open position.

Mounted on the bonnet chamber 8 above the restraining member 30 is a spring and shock assembly which includes a helically wound spring 40, an upper spring retainer 41 and a lower spring retainer 42. It is understandable that the spring 40, in resisting compression, would resist the upward movement of the restraining member 30. It is also understandable that upon upward movement of the restraining member 30 and compression of the spring 40, the spring 40 would store energy to apply an axial force tending to return the restraining member 30 to the position of FIG. 1.

Attached to the upper portion of the bonnet 7 is an adjustment screw 45 which may be covered by a protective housing 46. With the housing 46 removed, the adjusting screw 45 may be manipulated so as to adjust the axial force of the spring 40.

Centrally disposed in the bonnet chamber 8 is a shock assembly 50 which includes a cylindrical member 51 threadedly attached at 51a to the spring retainer 41. The lower end of the cylinder 51 is closed by a cap 52 which is provided with a central aperture 53 through which extends a rod or shaft 54. Annular seals 55 and 56 seal the interior of the cylinder 51 so that it may be filled with a hydraulic fluid 57. The lower end of the shaft or rod 54 is threaded to receive a nut 58 by which the lower spring retainer 42 is held in place. The nut 58 may be received in a cavity 35 of the restraining member 30.

The upper end of the shaft or rod 54 is provided with a valve mechanism which includes a fixed disc 60 from the lower side of which depends a threaded cylindrical portion 61 surrounded by a circular valve plate 63 having a number of ports or passageways 64 radially disposed therearound. The valve plate 63 is free to slide on the cylindrical portion 61 between the limits of the underside of disc 60 and the annular shoulder 59 provided at the end of the shaft or rod 54. There is a slight amount of clearance 65 between the valve plate 63 and the interior of the cylinder 51. Thus, it can be seen that if the rod 54, disc 60 and valve plate 63 are moved upwardly in the cylinder 51, fluid 57 may be displaced through the ports 64 and the clearance 65. However, when this movement is reversed, the valve plate 63 will move upwardly to engage the lower surfaces of the disc 60 so that the ports 64 are closed. In this case, fluid is allowed to be displaced only through the much smaller area of the clearance 65. Thus, some resistance in shock absorption is provided if the rod 54 is moved upwardly. Much greater resistance and shock absorption is provided if the rod 54 is moved downwardly.

The relief valve R of FIG. 1 operates in the following fashion. In its initial or closed position, the components of the valve will be as appears in FIG. 1. Assuming that the valve R is connected in a pressure system, the pressure of which is communicated to port 3, this fluid pressure will be acting on the circular area at the lower end of the pilot piston or plunger 17 and also acting on the surrounding annular area at the end of the plug assembly 10. While these pressures produce axial forces which tend to lift these elements, the plug assembly 10 is prevented from doing so initially by the engagement of the thrust plate 22 with the lower surfaces of the split ring 27. The only forces tending to prevent the lifting of the pilot piston or plunger 17 are the counteracting forces of the spring 40, the resistance created in the shock assembly 50 and friction between the movable parts.

As the pressure in the port 3 increases, enough force may be created on the lower end of the pilot piston or plunger 17 to overcome the spring 40 and the shock assembly 50. The amount of pressure necessary to do so is controlled primarily by the spring 40 and this pressure can be varied within certain limits by adjustment of the adjustment screw 45. When such predetermined pressure is reached, the spring 40 is compressed and the cylindrical restraining member 30 is raised until the lower cylindrical surface 31 thereon disengages the interior of the split ring 28. As soon as this occurs, the axial forces created by the pressure in port 3 on the annular end surfaces of the plug assembly 10 are substantial, these forces are transferred through the thurst plate 22 to the split ring 27. Due to the cooperating tapered surface 28 on the split ring 27 and the corresponding tapered surface 26 on the lower end of the ring 24, a portion of these axial forces are transmitted to radial forces which tend to contract the split ring 27. By proper design, the ring 27 may be caused to contract quickly, as soon as the restraining member 30 has disengaged the interior thereof, so that the outside diameter of the contracted split ring 27 is less than the inside diameter of the ring 24. This then permits the ring 27 and thrust plate 22 to move upwardly within the ring 24 and allows the plug assembly 10 to move upwardly to an open position allowing fluid pressures to be relieved through the outlet port 4 via the inlet port 3 and the cavity 2. The shock assembly 50 aids to cushion any quick movement thereof. In addition, a resilient bumper ring supported on a bumper washer 71 will help to cushion this movement, if the plug assembly 10 moves to its most upward position as the resilient bumper ring 70 engages the annular surface at the end of the bushing 12.

As the pressure in the fluid pressure system is relieved and sufficiently reduced, the energy stored in compression of the spring 40 (a part of the reset mechanism) is converted to a downwardly acting axial force which causes the restraining member 30 to move downwardly against the upper surface of the split ring 27 until the split ring is again located below the annular surface 26. At this point, the split ring 27 expands to the initial position of FIG. 1. As this occurs, the inside diameter of the expanded and relaxed split ring 27 is then large enough for the cylindrical surface 31 of the restraining member 30 to reengage the interior of the ring, again preventing its contraction and preventing the upward movement of the plug assembly 10. Thus, the relief valve R is reset and ready for opening on the occurrence of predetermined pressure levels in the port 3.

Referring now to FIGS. 2, 3, 4, and 5, alternate embodiments of the relief valve of the present invention will be described. While each of these embodiments is different, they all utilize similar principles, especially the use of a split ring release mechanism which allows the valve to be opened at predetermined pressure levels.

Figure 2:
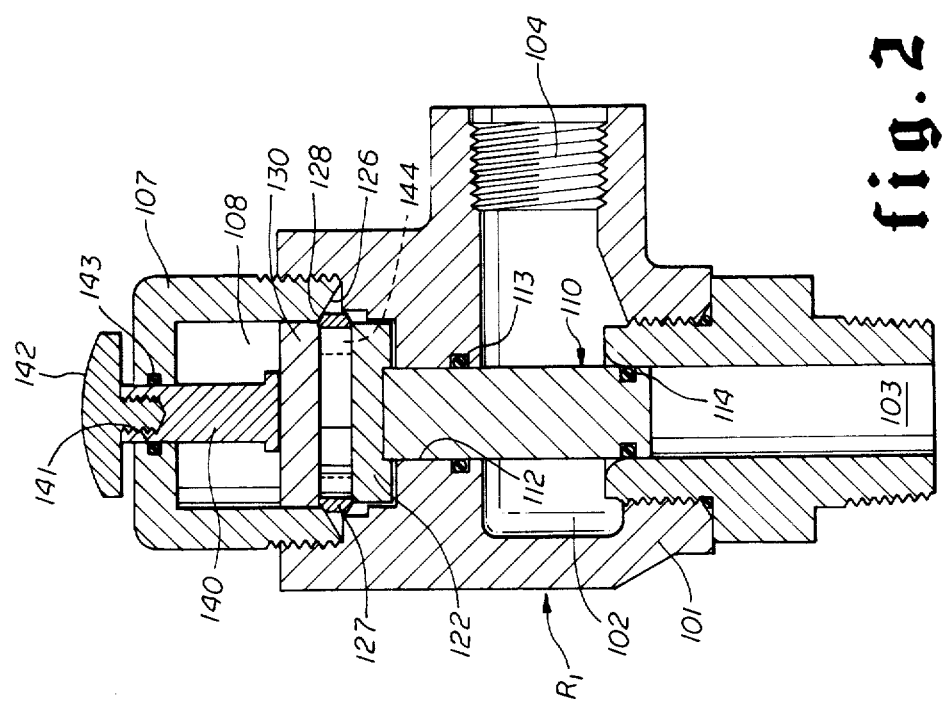
FIG. 2 is an elevation view, in section, of an alternate embodiment of the invention which is manually resettable.

In FIG. 2, relief valve $R_1$ includes a valve body 101 having a cavity 102 through which fluid may flow from inlet port 103 to outlet port 104, upon opening of the plug assembly 110. The plug assembly 110 in this embodiment is essentially a cylindrical member provided with an annular seal 114 which provides a sliding and sealing contact with the port 103. The plug assembly 110 projects through an aperture 112 where it is sealingly contacted by an annular seal member 113. Like in the embodiment of FIG. 1, a thrust plate 122 rests on the upper end of the plug assembly 110 for movement therewith. A valve bonnet 107 provides a cavity 108 in which is disposed the thrust plate 122, a split ring 127 and another thrust plate 130. The split ring 127 is provided with a beveled annular surface 128 which engages a correspondingly tapered annular shoulder 126 provided by the bonnet 107. Disposed above the thrust plate 130 is a plunger 140 which extends through an aperture 141 in the bonnet terminating in a plunger nob 142. An annular seal 143 is provided around the plunger 140.

In this embodiment, there is no pilot mechanism such as in the embodiment of FIG. 1. Consequently, as pressure increases in port 103 against the lower end of the plug assembly 110, an axial force is developed which is transferred through the thrust plate 122 to the lower surfaces of the split ring 127. Part of this axial force is converted to radial forces by the coaction between the tapered surfaces 126 and 128 causing the split ring 127 to be contracted until the outside diameter thereof is reduced sufficiently to move upwardly within the chamber 108. When this occurs the plug assembly 110 moves to an open position, allowing pressures in port 103 to be relieved through the cavity 102 and the outlet port 104.

Unlike the valve of the previous embodiment, this relief valve $R_1$ must be manually reset. To do so, a downwardly directed force is applied to the head 142 of the plunger 140. This force is then transferred through the thrust plate 130 to the contracted split ring 127 until the split ring 127 is moved downwardly again to the initial position of FIG. 2 where the split ring 127 expands to its initial relaxed or free position underneath the annular shoulder 126. The valve is then reset for relieving further increases in pressure above a predetermined level.

As an alternate to this embodiment, one or more additional split rings 144, etc. may be placed inside of the split ring 127 providing additional resistance against radial contraction and requiring a greater amount of axial force and consequently pressure in port 103 to open the relief valve $R_1$. In this manner, the same relief valve $R_1$ may be adapted for different pressure level openings.

Figure 3:
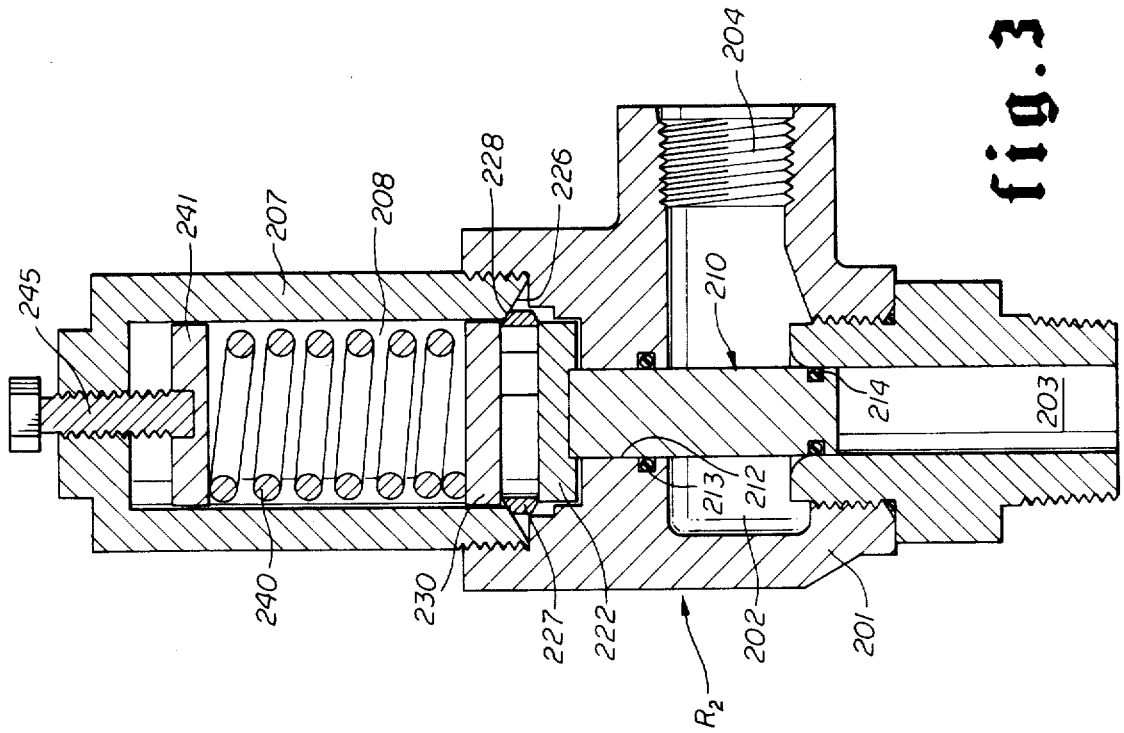
FIG. 3 is an elevation view in section, of an automatically resettable relief valve according to another embodiment of the invention.

The relief valve $R_2$ of FIG. 3 illustrates an alternate embodiment of the present invention which is almost identical to the one shown in FIG. 2, except for the reset mechanism thereof. In fact, the parts such as the body 201, plug assembly 210, thrust plate 222, split ring 227 and thrust plate 230 could be interchangeable with like parts of the valve $R_1$ shown in FIG. 2.

The primary difference in the relief valve $R_2$ in FIG. 3 and the relief valve $R_1$ in FIG. 2 is that the relief valve $R_2$ is automatically resettable whereas the relief valve $R_1$ in FIG. 2 is manually resettable.

To provide for the automatic resetting of the relief valve $R_2$ a helically wound spring 240 is placed in the valve bonnet 207 above the thrust plate 230. A spring retainer 241 is surmounted on the spring 240 and an adjustment screw 245, similar to the adjustment screw 45 in FIG. 1, threadedly engages a threaded hole provided in the end of the bonnet 207.

The relief valve $R_2$ operates in the following fashion. As pressure increases in port 203 against the lower end of the plug assembly 210, an axial force is developed which is transferred through the thrust plate 222 to the lower surfaces of the split ring 227. Part of this axial force is converted or translated to the radial forces by the coaction between the tapered surfaces 226 and 228. This causes the split ring 227 to be contracted until the outside diameter thereof is reduced sufficiently to move upwardly within the chamber 208. When this occurs, the plug assembly 210 moves to an open position allowing pressures in the port 203 to be relieved through the cavity 202 and the outlet port 204.

As the plug assembly 210, thrust plate 222, split ring 227 and thrust plate 230 move upwardly, the spring 240 is compressed storing energy therein. When the pressure in the port 203 is sufficiently reduced, the stored energy in spring 240 is converted to an axial force which returns the plug assembly 210 and the other movable components back toward the closed position shown in FIG. 3. When the fully closed position is reached, the split ring 227 is allowed to expand so that the tapered surface 228 thereon again engages the tapered shoulder 226 of the bonnet 207. The valve $R_2$ is then again latched or reset in the closed position and will not open until the pressure in port 203 again reaches a predetermined level necessary for relief. This predetermined pressure level can be varied by adjusting the adjustment screw 245 so as to place different preloads on the spring 240.

Figure 4:
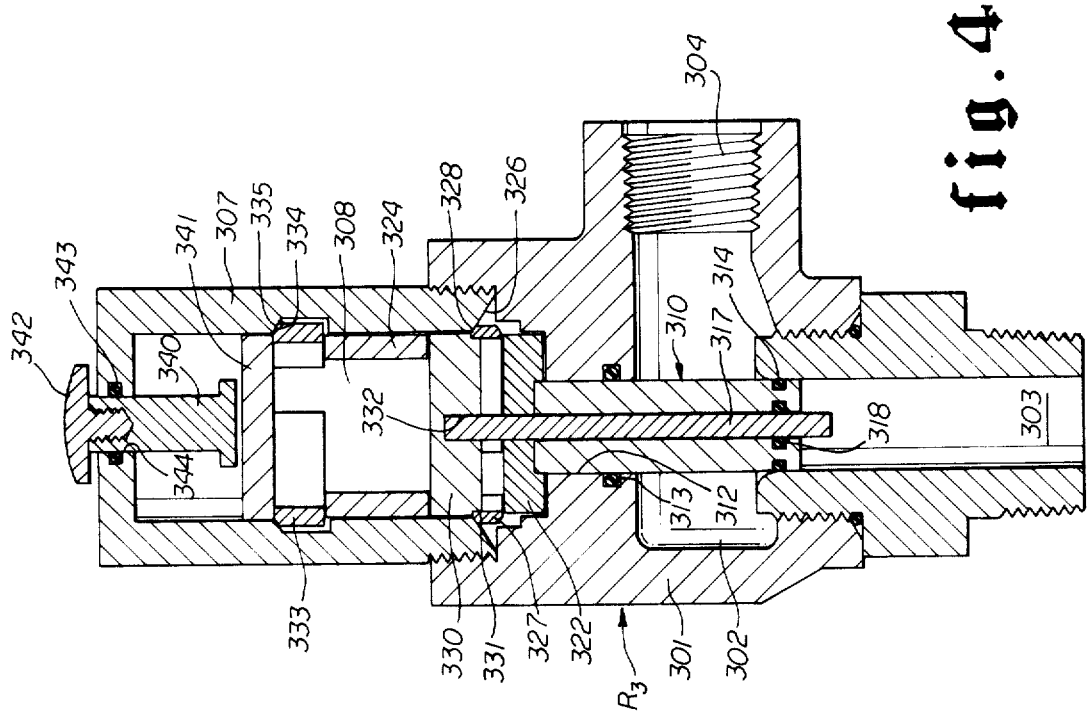
FIG. 4 is an elevation view, in section, of a manually resettable relief valve according to still another embodiment of the invention.

The relief $R_3$ in the embodiment of FIG. 4 is much the same as the embodiment shown in FIG. 1. The valve body 301, cavity 302, ports 303 and 304, the plug assembly 310, the split ring 327, all function in similar fashions. Also like the relief valve R in FIG. 1, a pilot piston or plunger 317 is provided in a central hole through the plug assembly 310. The upper end of the pilot piston 317 engages a recessed hole 332 in the thrust plate 330. It will be noted that the thrust plate 330 has a reduced diameter portion thereon providing a cylindrical surface 331 which in the closed position illustrated in FIG. 4 engages the interior of the split ring 327, preventing contraction thereof.

Surmounted on the thrust plate 330 is a cylindrical ring 324 above which is disposed another split ring 333. The bonnet 307 is machined with an annular groove having a tapered annular shoulder 334 therein for mutual engagement with a tapered shoulder 335 of the split ring 333.

Directly above the second split ring 333 is another thrust plate 341. Centrally disposed in the hole 344 and projecting downwardly therethrough toward the thrust plate 341 is a plunger 340 the head 342 of which is exposed externally of the valve bonnet 307. Annular seal 343 permits reciprocation of the plunger 340 while sealing the chamber 308 from the external environment.

The relief valve $R_3$ of FIG. 4 operates as follows. In its initial closed position, the components of the valve will be as appears in FIG. 4. It is assumed that the valve $R_3$ is connected to a pressure system, the pressure of which is communicated to port 303. This fluid pressure will be acting on the circular area at the lower end of the pilot piston or plunger 317 and also acting on the surrounding annular area at the end of the plug assembly 310. While these pressures produce axial forces which tend to lift these elements, the plug assembly 310 is prevented from doing so, initially, by the engagement of thrust plate 322 with the lower surfaces of the split ring 327. As earlier noted, the split ring 327 is prevented from contraction by the cylindrical surface 331 on the thrust plate or restraining member 330.

The axial force transferred through the pilot piston or plunger 317 is directly transmitted to the thrust plate or restraining member 330. Due to the ring 324 this force is also transmitted to the lower surfaces of the split ring 333. However, it will be noted that there is no restraining member to prevent the contraction of the split ring 333. Thus, as the pressure in port 303 is raised to a sufficient level, the axial force developed thereby is partially translated to radial forces, due to the coaction between the tapered shoulder 334 of housing 307 and the tapered surface 335 of the split ring 333. This radial force causes the split ring 333 to contract until the outside diameter thereof is sufficiently reduced to allow the split ring 333 to move upwardly within the chamber 308. When this occurs, the thrust plate or restraining member 330 is also allowed to move upwardly within the chamber 308 so that the cylindrical surface 331 disengages the interior of the split ring 327. As soon as this occurs, the axial forces developed on the annular surface at the end of the plug assembly 310 is partially translated to radial forces tending to contract the split ring 327. Again, this is due to the coaction between the tapered shoulder 326 and the tapered annular surface 328 on the split ring 327. As soon as the split ring 327 is sufficiently contracted, the axial forces developed on the plug assembly 310 will cause the split ring 327 to move upwardly within the chamber 308, allowing the thrust plate 322 and the entire plug assembly 310 to move upwardly to an open position to which the pressure in port 303 will be relieved through cavity 302 and outlet port 304.

As in the embodiment of FIG. 2, the relief valve $R_3$ is manually reset. This is accomplished by pushing downwardly on the plunger head 342 so that an axial force is transmitted through the plunger 340 to the thrust plate 341. This causes all of the components within the chamber 308 to be moved back toward the initial or closed position of FIG. 4. As soon as the split ring 333 reaches its respective annular groove in the valve body 307, it expands to its natural or free position in which the tapered surface 335 thereon reengages the tapered shoulder 334. At the same time, the split ring 327 reaches its initial position expanding to its relaxed or free position so that its tapered surface 328 reengages the tapered shoulder 326. In the last portion of the resetting movement, the cylindrical surface 331 of the thrust plate or restraining member 330 reengages the interior of the split ring 327, locking or latching the relief valve $R_3$ in its reset closed position of FIG. 4. Further fluid flow through the relief valve $R_3$ is then prevented until the pressure in the port 303 again reaches a predetermined pressure level.

Figure 5:
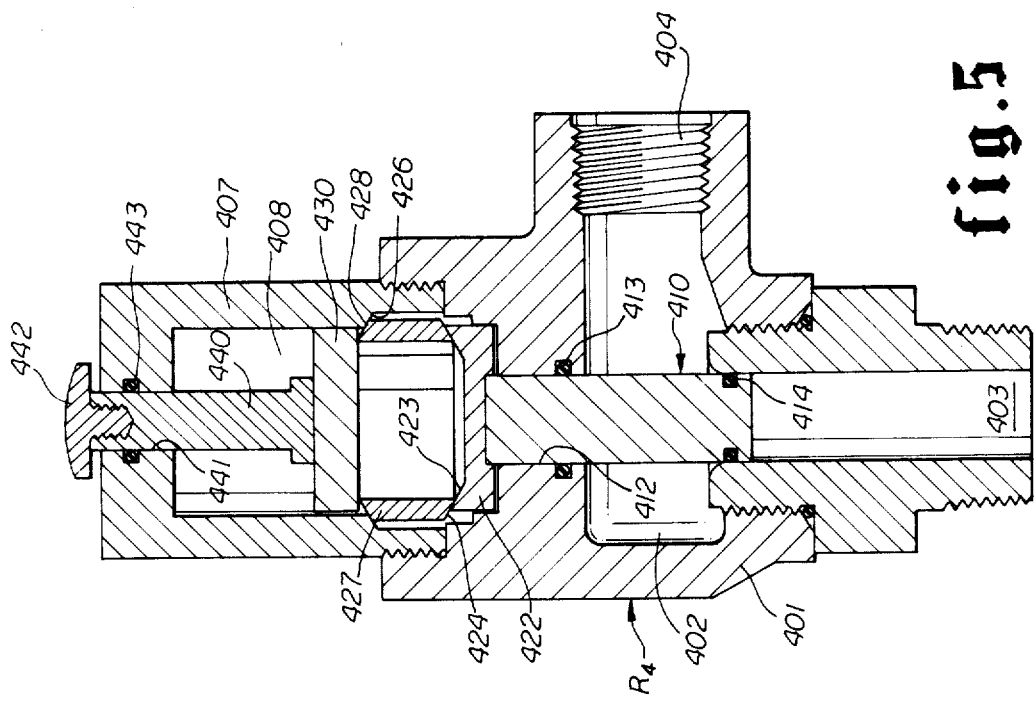
FIG. 5 is an elevation view, in section, of a manually resettable relief valve according to still another embodiment of the invention.

The relief valve $R_4$ of FIG. 5 is another alternate embodiment which is very similar to the relief valve $R_1$ shown in FIG. 2. The valve body 401, plug assembly 410, valve bonnet 407, reset plunger 440 and associated components are almost identical except perhaps as to the dimensions thereof.

Like in the relief valve $R_1$ of FIG. 2, a split ring 427 having a tapered surface 428 thereon and a cooperating annular tapered shoulder 426 is provided. However, it will be noted that in this embodiment, the upper end or side of the thrust plate 422 is provided with an inwardly tapered annular shoulder or surface 423. The split ring 427 is provided with a corresponding and cooperating tapered surface 424.

The relief valve $R_4$ of FIG. 5 operates as follows. As pressure increases in port 403 against the lower end of the plug assembly 410, an axial force is developed which is transferred through the thrust plate 422 to the lower surfaces of the split ring 427. Part of this axial force is translated to an inwardly directed radial force by the coaction between the tapered surface 423 of the thrust plate 422 and the tapered surface of the lower surface 424 of the split ring 427 as well as the tapered surface 428 and the tapered annular shoulder 426. These radial forces cause the split ring 427 to be contracted until the outside diameter thereof is reduced sufficiently to move upwardly within the chamber 408. When this occurs the plug assembly 410 moves to an open position, allowing pressures in the port 403 to be relieved through the cavity 402 and the outlet port 404.

Just like the embodiment shown in FIG. 2, the relief valve $R_4$ is manually reset. To do so, a downwardly directed force is applied to the plunger head 442. This force is then transferred to the plunger 440 and the thrust plate 430 to the contracted split ring 427 causing the split ring 427 to be moved downwardly again to the initial position of FIG. 5 where the split ring 427 expands to its initial relaxed or free position underneath the annular shoulder 426. The valve is thus reset for relieving further increases in pressure in the port 403 above a predetermined level.

From the foregoing description, it can be seen that the relief valve of the present invention is relatively simple in construction, operation and maintenance. It is extremely rugged and suitable for harsh uses such as found in drilling fluid systems used in drilling for oil and/or gas. Even though the valve is relatively simple and rugged, it is extremely reliable and accurate. Furthermore, it can be designed for automatic or manual resetting. It eliminates many of the problems associated with prior art relief valves designed for similar applications.

Several embodiments of the invention have been described herein. Many variations thereof can be made by those skilled in the art without departing from the spirit of the invention. Accordingly, it is intended that the scope of the invention be limited only by the claims which follow.

I claim:

1. A relief valve for relieving excessive fluid pressures in a fluid pressure system comprising:

a valve body having a cavity therein and an inlet port and an outlet port in fluid communication with said cavity;

plug means carried in said valve body for reciprocal movement between a closed position in which said plug means prevents flow of fluids through said inlet port and an open position, in which said plug means permits flow of fluids through said inlet port and into said cavity for exit through said outlet port; and release means carried by said valve body for holding said plug means in said closed position but responsive to fluid pressures above a predetermined amount at said inlet port to release said plug means for movement toward said open position, said release means including a split ring engageable with a corresponding annular shoulder carried by said valve body for holding said plug means in said closed position, said split ring being radially contractable in response to said predetermined fluid pressures for disengagement from said annular shoulder, allowing said plug means to move toward said open position.

2. A relief valve as set forth in claim 1 in which the mutually engaging surfaces of at least one of said split ring and said annular shoulder are tapered relative to the axis of said plug means.

3. A relief valve as set forth in claim 1 in which one of said plug means and said inlet port is provided with seal means engageable with the other of said plug means and said inlet port, when said plug means is in said closed position, to sealingly prevent flow of fluids through said inlet port into said cavity.

4. A relief valve as set forth in claim 1 including reset means carried by said valve body by which an axial force may be applied to said release means and said plug means to return said plug means to said closed position and said split ring to engagement with said annular shoulder, when the fluid pressure in said fluid pressure system is reduced below said predetermined fluid pressure.

5. A relief valve as set forth in claim 4 in which said reset means includes a plunger projecting outwardly of said valve body and manually operable for applying said axial force to said release means and said plug means.

6. A relief valve as set forth in claim 4 in which said reset means includes spring means carried by said valve body for automatically applying said axial force to said release means and said plug means.

7. A relief valve as set forth in claim 6 including adjustment means engageable externally of said valve body and by which said predetermined pressure may be changed.

8. A relief valve as set forth in claim 1 including pilot means carried by said plug means including a piston member slidingly, sealingly and coaxially disposed in a central hole in said plug means, one end of which is exposed to pressure in said inlet port and responsive to said predetermined pressure to activate said release means so that upon activation thereof said means will quickly move to said open position and not return to said closed position until said system pressures are reduced substantially below said predetermined pressure.

9. A relief valve as set forth in claim 1 including shock means disposed in said valve body above said plug means for cushioning the movement of said plug means toward said open position upon release thereof by said release means, said shock means comprising a fluid filled cylinder having a damper member therein attached to said plug means movable through the fluid in said fluid filled chamber but impeding the movement of said plug means toward said open position upon release by said release means.

10. A relief valve as set forth in claim 1 including at least one other split ring engageable with a corresponding annular shoulder carried by said valve body for holding said plug means, said other split ring being radially contractable prior to said radial contraction of said first mentioned split ring in response to said predetermined pressure in said inlet port.

11. A relief valve for relieving excessive fluid pressures in a fluid pressure system comprising:
a valve body having an inlet port, an outlet port and a flow cavity therebetween;
plug means carried by said valve body for reciprocal movement therein between a closed position, in which said plug means prevents flow of fluids through said inlet port, and an open position, in which said plug means permits flow of fluids through said inlet port and into said cavity for exit through said outlet port;
release means associated with said plug means for holding said plug means in said closed position but responsive to fluid pressures above a predetermined level at said inlet port to release said plug means for movement toward said open position, said release means including at least one split ring engageable with a corresponding annular shoulder carried by said valve body for holding said plug means in said closed position, said split ring being radially contractable in response to said predetermined fluid pressure for disengagement from said annular shoulder, allowing said plug means to move toward said open position; and
reset means carried by said valve body by which an axial force may be applied to said release means and said plug means to return said plug means to said closed position and said split ring to engagement with said annular shoulder when said fluid pressure in said fluid pressure system is reduced below said predetermined level.

12. A relief valve as set forth in claim 11 in which said plug means comprises a cylindrical plug member one end of which slidingly and sealingly engages said inlet port when in said closed position and a bearing surface at the opposite end of said plug member, said bearing surface engaging said split ring preventing movement of said plug means toward said open position when said split ring is in engagement with said annular shoulder.

13. A relief valve as set forth in claim 12 in which said release means includes a restraining member, a cylindrical surface of which is engageable with the interior of said split ring to prevent said radial contraction of said split ring, said restraining member being axially displaceable from said split ring, in response to said predetermined pressure level, to permit said radial contraction of said split ring.

14. A relief valve as set forth in claim 13 in which said release means includes a piston member slidingly and sealingly coaxially disposed in a central hole in said plug member, one end of said piston member engaging said restraining member for applying an axial force thereto for said axial displacement of said restraining member in response to said predetermined pressure level exposure to the opposite end of said piston member.

15. A relief valve as set forth in claim 13 in which said reset means includes a spring member carried by said valve body coaxially with said plug means and one end of which bears against said restraining member, said spring member being compressible upon said axial displacement of said restraining member in response to said predetermined pressure level, storing energy to provide said axial force for returning said plug means and said split ring to engagement with said annular shoulder when said fluid pressure is substantially reduced before said predetermined level.

16. A relief valve as set forth in claim 15 including adjustment means carried by said valve body, engageable with said spring member and adjustable externally of said valve body for changing the predetermined fluid pressure to which said release means is responsive to releasing said plug means for said movement toward said open position.

17. A relief valve as set forth in claim 11 including shock means disposed in said valve body above said plug means for cushioning the movement of said plug means toward said open position upon release thereof by said release means.

18. A relief valve as set forth in claim 17 in which said shock means comprises a fluid filled cylinder having a damper member therein for impeding the movement of said plug means toward said open position upon release by said release means.

19. A relief valve as set forth in claim 18 in which said damper means includes a valve member having a first flow area through which fluid in said fluid filled cylinder may pass upon movement of said plug means, toward said open position and a second and smaller flow area through which fluid in said fluid filled cylinder may pass upon movement of said plug means toward said closed position.

20. A relief valve as set forth in claim 17 in which said shock means comprises a resilient ring surrounding said plug means and adjacent to an annular shoulder thereon, said resilient ring being engageable with a portion of said valve body upon movement of said plug means to said open position to cushion and arrest said movement of said plug means.

* * * * *

UNITED STATES PATENT OFFICE
CERTIFICATE OF CORRECTION

Patent No. 4,497,338      Dated February 5, 1985

Inventor(s) William E. Baker

It is certified that error appears in the above-identified patent and that said Letters Patent are hereby corrected as shown below:

Column 11, line 40, after "said" insert -- plug --.

Signed and Sealed this

Twenty-third Day of July 1985

[SEAL]

Attest:

DONALD J. QUIGG

Attesting Officer     Acting Commissioner of Patents and Trademarks